United States Patent Office 3,505,259
Patented Apr. 7, 1970

3,505,259
COMPOSITION AND PROCESS FOR RECLAIMING BLENDS OF WAX AND ETHYLENE VINYL ACETATE COPOLYMERS
Thomas Hallis, Jr., Brea, Calif., assignor to Union Oil Company of California, Los Angeles, Calif., a corporation of California
No Drawing. Filed Aug. 8, 1967, Ser. No. 658,997
Int. Cl. C08f 45/52
U.S. Cl. 260—28.5                    12 Claims

ABSTRACT OF THE DISCLOSURE

Heat sealing characteristics of blends of wax and ethylene-vinyl acetate copolymers are restored or improved by heating the blend to about the decomposition temperature of the ethylene-vinyl acetate copolymers. The composition produced by this process has a lower viscosity than the untreated material.

---

This invention relates to new and improved blends of wax and ethylene-vinyl acetate copolymers. More specifically this invention relates to the improvement of sealing characteristics of these blends by heat treating the blends to about the decomposition temperature of the ethylene-vinyl acetate copolymer.

The use of wax as a paperboard coating has a significant cost advantage over polyethylene and other high polymeric materials, the wax being cheaper by at least ten cents a pound. In addition, wax coatings for paperboard and similar materials are much easier to apply than polyethylene; moreover because of its transparency, the wax can be applied to a substrate which has already been printed. In the case of polyethylene film, the surface of the film must be treated prior to printing in order to render it receptive to printing inks. The use of a wax coating makes it far easier to provide a good heat seal than when using a polyethylene coating.

Wax coated paperboard and paper materials find their uses in applications where high gloss and a good moisture barrier are required and consequently waxes are employed for coating and impregnating frozen food packages, margarine containers, milk cartons, etc.

Various additives are employed in the wax to achieve certain properties; these include slip agents, antiblocking agents, antioxidants, and antiscuff agents, etc., which are added in minor quantities.

Besides these additives, certain polymers are added to improve vapor barrier resistance, sealing strength and gloss. Other polymers are employed in the wax to raise the melting point of the blend and permit high coating temperatures to be attained. This results in a good heat seal bond between the paperboard and the wax; moreover the polymers impart greater toughness and flexibility to the wax blend. One such polymer contained in the blend is an ethylene-vinyl acetate copolymer which may be employed in amounts of from about 5% to about 35% by weight of the blend.

Since heat seal is one of the most important properties of the blend, if this property is impaired significantly the blend will be rendered useless. It is usually impractical or unwise to work off such a blend into other satisfactory materials and therefore the blend must be scrapped.

In addition, blends may be manufactured for experimental purposes and if the heat seal characteristics are unsuitable, the blend is usually discarded even if other properties are satisfactory. Also, blends may be manufactured incorrectly or may become obsolete; ordinarily, they too must be discarded.

With this background in mind, it is an object of the invention to provide a new and improved wax blend containing an ethylene-vinyl acetate copolymer.

Another object is to provide a wax blend containing an ethylene-vinyl acetate copolymer having improved heat sealing properties.

Another object is to provide a wax blend having a lower viscosity than blends of similar composition.

Another object is to provide a process for reclaiming blends of wax containing ethylene-vinyl acetate copolymers which might normally be discarded because of poor heat sealing properties.

Further objects of the invention will become apparent from the description to follow.

The objects of the invention are attained by heating a blend of wax containing an ethylene-vinyl acetate copolymer at about the decomposition temperature of the copolymer for a sustained period of time. It has been found that the heat seal properties of the wax blend are increased significantly by this heat treatment. Also the viscosity decreases and this permits thinner coatings of wax to be applied to the paperboard.

To achieve the desired results, the blend should be heated for a sufficient period of time at about the decomposition temperature of the ethylene-vinyl acetate copolymer. These copolymers may be purchased under the trademark name of Elvax vinyl resins manufactured by the E. I. Du Pont de Nemours & Company. The manufacturer's specifications for this material is to be found in the technical information bulletin PL2-162. It is entitled, "'Elvax' Vinyl Resins in Adhesives and Adhesive Coatings" and published for the Polymer Products Division, Electrochemicals Department of the E. I. Du Point de Nemours & Company. On page 7 of the bulletin it is stated that "Elvax" resins should not be held at temperatures above 300–350° F. for sustained periods since the copolymer decomposes thermally at about 400° F.; mixing instructions call for heating to 250–300° F.

It has been discovered that, contrary to these instructions, if the copolymer in the wax blend is heated preferably to about 350–410° F. for about 30–150 minutes, significant improvements in heat seal properties are attainable. Coincident with the improvement in heat seal properties, the wax blend containing the copolymer changes in color from white to a light brown. No analytical method has yet been devised which distinguishes a chemical difference between the modified and the heat treated wax blend containing the ethylene-vinyl acetate copolymer. However, the discoloration is a good indication that the heat treated wax blend possesses improved heat seal properties. Obviously, temperatures somewhat outside the 350–410° F. range may be employed. If the heat treatment is carried out at or somewhat below 350° F., a longer heating time will be required to achieve equivalent heat seal properties compared to a heat treatment at, or somewhat above 410° F. At temperatures significantly below about 350° F., the heat treatment for producing an adequate heat seal, takes too long to be commercially useful. If the heat treatment is significantly greater than 410° F., the homogeneity of the wax blend is difficult to control and decomposition products appear.

The useful concentration of vinyl acetate in the copolymer varies from about 16–40%, with the preferred range being about 25–33%. Concentrations of vinyl acetate in excess of about 40% are not compatible with petroleum waxes while concentrations of vinyl acetate below about 18% do not enable the heat treatment process to produce commercially adequate heat sealing properties. Elvax 150, 220, 250 and 420 are the trademark names of the E. I. du Pont de Nemours & Company for ethylene-vinyl acetate coploymers containing 33%, 28%, 28% and 18% of vinyl acetate respectively in the copolymer and which are suitable for use in the present invention.

The useful concentration of the ethylene-vinyl acetate copolymer in the wax varies from about 15–40%, with the preferred range being about 25–35%, base on total weight of copolymer plus wax. If the ethylene-vinyl acetate copolymer is employed in amounts greater than about 40%, the cost of the wax blend increases significantly. If the copolymer is employed in amounts less than about 15%, insufficient toughness and flexibility is imparted to the wax blend.

The waxes which may be employed in this invention vary in mean molecular weight from about 425 to about 1500.

The waxes at the 425 end of the molcular weight range are linear paraffins which occur naturally in crude oil and which have been separated therefrom. One particularly preferred type of wax containing about 40 carbon atoms per molecule and known as Aristowax 165, is sold by the Union Oil Company of California. Another type of preferred low molecular weight wax employed in the blend contains about 30 carbon atoms per molecule, has a molecular weight of about 425, and known as Aristowax 143/150, is sold by Union Oil Company of California.

The waxes at the 1500 end of the molecular weight range are of the microcrystalline type. The microcrystalline wax promotes heat sealability and imparts improved gloss to the blend. A preferred type is sold by the Sunray DX Oil Company, Tulsa, Olka., under the trade name of Sunray DX M160S.

Another preferred type of microcrystaline wax employed in the wax blend is known as Smiths Bluff 180DOM. It has a molecular weight of about 1500 and is used to promote heat sealability and impart improved gloss to the blend.

Examples of wax compositions containing an ethylene-vinyl acetate copolymer and their heat treatments are listed below.

Example 1: Weight percent
Aristowax 165 _____ 61.45
Elvax 220 _____ 13.0
Elvax 420 _____ 13.0
A–C 6 _____ 5.0
Micorcrystalline wax, 160° F. M.P., molecular weight about 1500 (gloss, gloss retention, machine runability) _____ 6.0
Dioleoyl ethylene diamine (scuff resistance) _____ 0.75
Superfloss (antiblocking) _____ 0.75
2,6-di-tertbutyl-p-cresole (antioxidant) ____ 0.05

A wax blender is flushed with twenty pounds of Aristowax 165 and 100 pounds of wax blend is added to the blender and heated rapidly to 400–410° F. The blend is maintained at this temperature level for 120 minutes with gentle agitation and then converted into buttons which have a light brown color. The heat sealing characteristics of the heat treated wax blend are so strong that the surface fibers of a paperboard coated with the wax blend are torn loose on speration. The same wax blend which was not heat treated, failed this test. Furthermore the viscosity of the heat treated wax blend was reduced by about 10%. This permitted the blend to be applied more quickly and in thinner coats to the paperboard.

Example 2: Weight percent
Aristowax 165 _____ 53.7
Elvax 220 _____ 13.0
Elvax 420 _____ 13.0
A–C 6 _____ 5.0
Piccotex 120 _____ 7.5
Microcrystalline wax, 160° F. M.P., molecular weight about 1500 (gloss, gloss retention, machine runability) _____ 6.0
Dioleoyl ethylene diamine (scuff resistance) __ 1.0
Superfloss (anti-blocking) _____ 0.75
2,6-di-tertbutyl-p-cresole (antioxidant) _____ 0.05

The same procedure was followed as in Example 1. The heat sealing characteristics of the wax blend both before and after heat treatment are similar to those of Example 1. This also applies to the improvement in viscosity properties.

Example 3: Weight percent
Aristowax 143/150 _____ 53.75
Elvax 220 _____ 16.25
Elvax 250 _____ 14.25
Piccotex 120 _____ 10.00
Piccolyte S–115 _____ 5.00
Oleyl palmitimide (slip agent) _____ 0.70
2,6-di-tertbutyl-p-cresole (antioxidant) ____ 0.05

Example 4:
Aristowax 143/150 _____ 59.33
Elvax 220 _____ 16.25
Elvax 250 _____ 14.25
Piccotex 120 _____ 10.00
Erucamide (slip agent) _____ 0.12
2,6-di-tertbutyl-p-cresole (antioxidant) ____ 0.05

Example 5:
Aristowax 143/150 _____ 58.75
Elvax 220 _____ 16.25
Elvax 250 _____ 14.25
Piccotex 120 _____ 10.00
Oleyl palmitimide (slip agent) _____ 0.70
2,6-di-tertbutyl-p-cresole (antioxidant) ____ 0.05

The same precedure was followed as in Example 1 except that the heat treatment was carried out at a temperature of 350–360° F. The heat seal properties of the wax blend before and after heat treatment are about the same as in Example 1. This also applies to the improvement in viscosity properties.

When carrying out the heat treating process, it is preferred to maintain the thermal degradation temperature within a narrow range, say 10° F., to ensure uniform degradation of the wax blend.

Additional polymers may be contained in the wax blend impart hardness thereto. One suitable type is a polyethylene sold by the Allied Chemical Company under the brand name of A–C6 polyethylene. It has a mean molecular weight of about 2000 and is employed in concentrations up to about 10%.

Piccotex 120 is the trade name of a hard, saturated vinyl tolvene, alpha-methyl styrene copolymer which exhibits high resistance to discoloration or yellowing caused by heat, oxidation, etc. Piccotex 120 is manufactured by the Pennsylvania Inudstrial Chemical Corporation.

Superfloss is the trade name for diatomaceous silica products sold by the Johns-Manville Sales Corporation, and is employed as an anti-blocking agent.

Piccotex can be eliminated from the wax blend if desired since its use is optional from the standpoint of producing a satisfactory heat seal. Likewise the Piccolyte S-115, slip agents, antioxidants, superfloss, microcrystalline wax and dioleoyl ethylene diamine may be eliminated from the wax composition thereby permitting the concentration of the paraffin wax to be raised up to about 80%, with the 20% balance being the ethylene-vinyl acetate copolymer.

Piccolyte S-115 is the trademark name of a terpene polymer resin obtained by polymerising unsaturated terpenes such as β-Pinene. It is sold by the Pennsylvania Industrial Chemical Corporation. The material is used to impart increased heat sealability over and above that provided by the thermal degradation treatment.

It will be appreciated that other additives and polymeric materials can be substituted for those already mentioned provided they impart the desired properties to the wax while maintaining compatability with the wax.

I claim:

1. A composition comprising a thermally degraded blend containing wax having a molecular weight between about 425 and about 1500 and ethylene-vinyl acetate copolymer containing about 16% to about 40% vinyl acetate, said copolymer being present in concentrations ranging from about 15% to about 40%, based on total wax and ethylene-vinyl acetate copolymer, and said blend having been thermally degraded at temperatures ranging above about 350° F. for a time ranging over about 30 minutes.

2. The composition of claim 1 wherein said wax comprises a member selected from the group consisting of paraffin wax, microcrystalline wax, and mixtures thereof.

3. The composition of claim 1 wherein said ethylene-vinyl acetate copolymer is present in concentrations ranging from about 25% to about 35%, based on total wax and copolymer.

4. The composition of claim 1 wherein said copolymer contains about 25% to about 33% vinyl acetate.

5. The composition of claim 1 wherein said blend has been thermally degraded at temperatures ranging from about 350° F. to about 410° F. for a time ranging from about 30 to about 150 minutes.

6. The composition of claim 1 wherein there is included in said blend additional polymers selected from the group consisting of polyethylene, copolymers of vinyl toluene and alpha-methyl styrene, polyterpenes, and mixtures thereof.

7. A method for improving the heat sealing characteristics of a blend containing wax having a mean molecular weight between about 425 and about 1500 and ethylene-vinyl acetate copolymer containing from about 16% to about 40% vinyl acetate, said copolymer being present in concentrations ranging from about 15% to about 40%, based on total weight of wax and ethylene-vinyl acetate copolymer, which comprises heating said blend at temperatures ranging above about 350° F. for a time ranging over about 30 minutes and sufficient to thermally degrade said blend and improve the heat sealing characteristics thereof.

8. The method of claim 7 wherein said temperatures range from about 350° F. to about 410° F. and said time ranges from about 30 to about 150 minutes.

9. The method of claim 7 wherein said heating is continued for a time sufficient to impart a light brown color to said blend.

10. The method of claim 7 wherein said heating is maintained within a temperature range of about 10° F.

11. The method of claim 10 wherein said 10° F. temperature range is from 400° F. to 410° F.

12. The method of claim 7 wherein said wax comprises a member selected from the group consisting of paraffin wax, microcrystalline wax, and mixtures thereof.

References Cited

UNITED STATES PATENTS 2,811,154 10/1957 Hagenmeyer.
3,341,621 9/1967 Hagenmeyer et al.

FOREIGN PATENTS 645,914 11/1950 Great Britain.

OTHER REFERENCES

Blends of Ethylene Vinyl Acetate Copolymers and Wax as Flexible Paper Coatings, Lamar et al., May, 1962.

MORRIS LIEBMAN, Primary Examiner

S. L. FOX, Assistant Examiner

U.S. Cl. X.R.

260—87.3